L. ARKIN.
ANGLE GUIDE FOR TOOLS.
APPLICATION FILED FEB. 24, 1915.

1,186,063.

Patented June 6, 1916.

Witnesses:
Josephine H. Ryan
Richard W. Hall

Inventor:
Louis Arkin
by Roberts, Roberts
Attys.

UNITED STATES PATENT OFFICE.

LOUIS ARKIN, OF BOSTON, MASSACHUSETTS.

ANGLE-GUIDE FOR TOOLS.

1,186,063.       Specification of Letters Patent.     Patented June 6, 1916.

Application filed February 24, 1915. Serial No. 10,186.

*To all whom it may concern:*

Be it known that I, LOUIS ARKIN, a citizen of the United States, and resident of Boston, in the county of Suffolk and State of Massachusetts, have invented new and useful Improvements in Angle-Guides for Tools, of which the following is a specification.

My invention consists of an adjustable guide adapted to attachment to tools of miscellaneous character by which the angle at which the tool is to operate upon the material may be maintained with accuracy.

The attachment which constitutes my invention is intended for use particularly with tools which are held and guided by hand, and which are therefore peculiarly susceptible to error in presentation to the material being worked.

Figure 1:
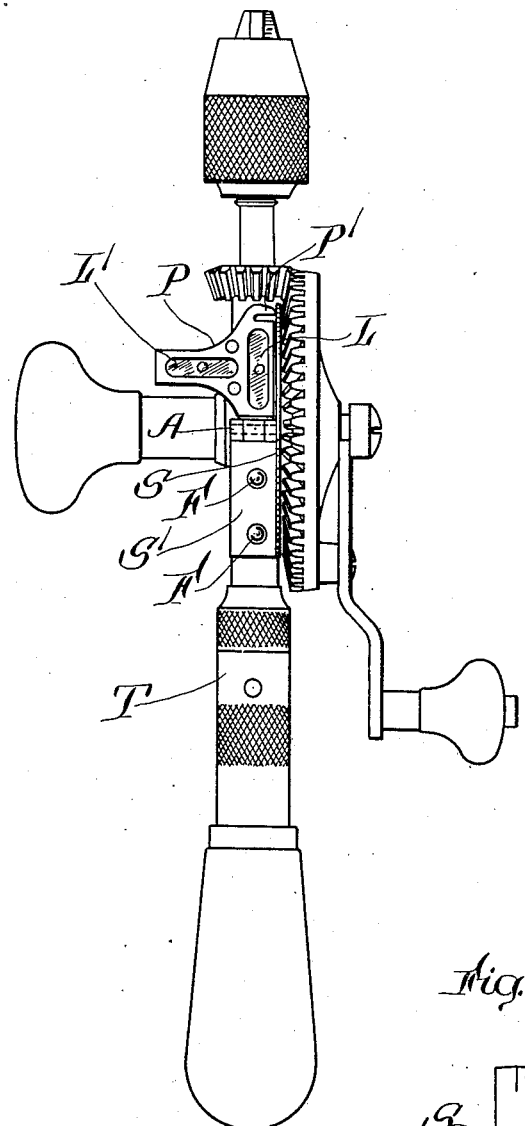
Figure 2:
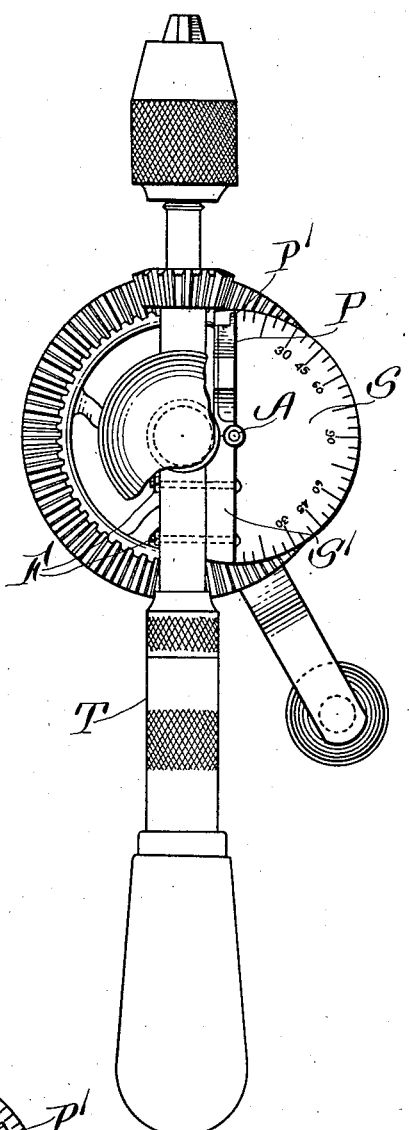
Figure 3:
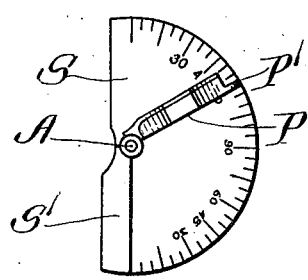

In the drawings hereto annexed which illustrate my invention, Figure 1 shows a breast drill in front elevation with the angle-determining appliance attached; Fig. 2 shows a side elevation of the same partly broken away; and Fig. 3 shows the angle-determining device detached.

The breast drill shown in the drawings is to be taken merely as an example or representative of tools of any kind which are used in situations in which the angle-determining attachment will be applicable. To the breast drill or other tool, marked T, there is attached a protractor plate or scale S by means of a base piece S′ and suitable fastenings F. A level carrier P is pivotally mounted to the protractor scale at A so that it may be turned for adjustment upon a pivot which coincides with the axis of the protractor scale. The level carrier P is provided with a primarily important spirit level L which is radially disposed with reference to the protractor scale S and with another spirit level L′ disposed parallel to the scale axis and which, while of utility in combination with the level L, is nevertheless of secondary or subordinate importance. The pivot joint at A is preferably made tight enough to hold the level frame P at any desired angular position. Preferably the level frame will be provided with an index point P′ at its outer extremity. The protractor scale S being attached to the tool T, preferably with its diameter of origin parallel with the axis of the tool holder, if it be desired to hold the tool at any predetermined angle measured from either the horizontal or vertical, the level frame P is adjusted angularly so that its index point P′ stands in the position on the protractor scale which corresponds to the angle at which the tool is to work. One such adjusted position of the level frame is shown in Fig. 3. The tool T is then applied to the work and its angle of address shifted until the spirit level L is in a horizontal position. In order to correct for errors which might otherwise be introduced by reason of rotary or lateral displacement of the tool, the spirit level L′ (if employed) may also be brought to a horizontal position. The tool is then operated in the usual manner, the workman keeping the two spirit levels L, L′, horizontal. By the use of the above described angle-determining device a hand tool may be made to approach much more nearly to accuracy than is otherwise possible. It may be that level indicating devices other than spirit levels can be substituted therefor, but obviously such substitution would not materially depart from the above described invention.

What I claim and desire to secure by Letters Patent is:

1. The combination of a protractor scale, and a pair of levels, one radially disposed with relation to the scale, the other parallel to the axis of the scale, the two levels pivotally mounted at the scale axis.

2. The combination of a protractor scale and a pair of levels, one radially disposed with relation to the scale and the other parallel to the axis of the scale, said levels being connected to swing as one part in a plane parallel with the plane of the scale.

3. The combination of a protractor scale, a level carrier provided with a pair of levels, one radially disposed with relation to the scale and the other parallel to the axis of the scale, said carrier adapted to swing in a plane parallel with the plane of the scale.

Signed by me at Boston, Massachusetts, this 19th day of February, 1915.

LOUIS ARKIN.

Witnesses:
    CHARLES D. WOODBERRY,
    JOSEPHINE H. RYAN.